United States Patent
Fu

(10) Patent No.: US 11,860,403 B2
(45) Date of Patent: Jan. 2, 2024

(54) BACKLIGHT MODULE INCLUDING OPTICAL FILM WITH PERIPHERAL PORTION LUG STRUCTURE AND DISPLAY DEVICE INCLUDING THE SAME

(71) Applicants: BEIJING BOE DISPLAY TECHNOLOGY CO., LTD., Beijing (CN); BOE TECHNOLOGY GROUP CO., LTD., Beijing (CN)

(72) Inventor: Changjia Fu, Beijing (CN)

( * ) Notice: Subject to any disclaimer, the term of this patent is extended or adjusted under 35 U.S.C. 154(b) by 229 days.

(21) Appl. No.: 17/425,711

(22) PCT Filed: Jan. 22, 2021

(86) PCT No.: PCT/CN2021/073276
§ 371 (c)(1),
(2) Date: Jul. 23, 2021

(87) PCT Pub. No.: WO2021/169693
PCT Pub. Date: Sep. 2, 2021

(65) Prior Publication Data
US 2022/0317364 A1    Oct. 6, 2022

(30) Foreign Application Priority Data
Feb. 24, 2020    (CN) .......................... 202020200212.5

(51) Int. Cl.
*F21V 8/00*      (2006.01)
*G02F 1/1333*    (2006.01)
*G02F 1/13357*   (2006.01)

(52) U.S. Cl.
CPC ......... *G02B 6/0088* (2013.01); *G02B 6/0051* (2013.01); *G02F 1/133317* (2021.01); *G02F 1/133325* (2021.01); *G02F 1/133608* (2013.01)

(58) Field of Classification Search
CPC ............. G02B 6/0088; G02F 1/133317; G02F 1/133325
See application file for complete search history.

(56) References Cited

U.S. PATENT DOCUMENTS

| 2014/0211124 A1* | 7/2014 | Huang .............. G02F 1/133608 |
| | | 362/606 |
| 2015/0009457 A1 | 1/2015 | Kubota |

(Continued)

FOREIGN PATENT DOCUMENTS

| CN | 103148459 A | 6/2013 |
| CN | 204855990 U | 12/2015 |

(Continued)

OTHER PUBLICATIONS

ISA China National Intellectual Property Administration, International Search Report and Written Opinion Issued in Application No. PCT/CN2021/073276, dated Apr. 15, 2021, WIPO, 16 pages.

*Primary Examiner* — Keith G. Delahoussaye
(74) *Attorney, Agent, or Firm* — McCoy Russell LLP

(57) ABSTRACT

A backlight module and a display device are provided. The backlight module includes: an optical film including a body portion and a peripheral portion surrounding the body portion, the peripheral portion including a lug structure; and a middle frame arranged at a side where a light-entering surface of the optical film is located and at least including a first portion and a second portion, the first portion being arranged proximate to the peripheral portion of the optical film, the second portion being arranged at a side of the first portion distal to the optical film, the first portion including an inner surface facing an interior of the backlight module and an outer surface opposite to the inner surface. A groove is formed in the first portion and extends from the inner surface to the outer surface.

17 Claims, 5 Drawing Sheets

(56) References Cited

U.S. PATENT DOCUMENTS

2016/0004007 A1    1/2016   Chen et al.
2022/0187528 A1*   6/2022   Zhou ................... G02B 6/0055

FOREIGN PATENT DOCUMENTS

| CN | 207764450 U | 8/2018 |
| CN | 207778159 U | 8/2018 |
| CN | 208314417 U | 1/2019 |
| CN | 211087786 U | 7/2020 |
| JP | 2015014751 A | 1/2015 |

* cited by examiner

BACKLIGHT MODULE INCLUDING OPTICAL FILM WITH PERIPHERAL PORTION LUG STRUCTURE AND DISPLAY DEVICE INCLUDING THE SAME

CROSS-REFERENCE TO RELATED APPLICATION

This application is the U.S. national phase of PCT Application No. PCT/CN2021/073276 filed on Jan. 22, 2021, which claims a priority of the Chinese patent application No. 202020200212.5 filed in China on Feb. 24, 2020, which are incorporated herein by reference in its entirety their entireties.

TECHNICAL FIELD

The present disclosure relates to the field of display technology, in particular to a backlight module and a display device.

BACKGROUND

In the related art, as a scheme for fixing an optical film of a display module, the optical film is provided with a certain amount of lug structures, chutes are formed in a side wall of a middle frame, and the lug structures of the optical film are inserted into the chutes respectively so as to be hung on the side wall of the middle frame.

There are the following problems for a fixation structure of the optical film. A gap is provided between the lug structure of the optical film and the middle frame at the chute, so light exits the middle frame directly through the gap. Currently, in an increasingly popular ultra-narrow bezel design, the lug structure of the optical film and the chute in the side wall of the middle frame are each arranged very proximate to a display region of a module screen, and a shadow of the lug structure is capable of being viewed in an image at a certain viewing angle. Hence, a visual effect and the user experience, and thereby display quality of the product, are adversely affected.

SUMMARY

An object of the present disclosure is to provide a backlight module and a display device.

In one aspect, the present disclosure provides in some embodiments a backlight module, including:
an optical film, wherein the optical film includes a body portion and a peripheral portion surrounding the body portion, and the peripheral portion includes a lug structure;
a middle frame, wherein the middle frame is arranged at a side where a light-entering surface of the optical film is located, and at least includes a first portion and a second portion, the first portion is arranged proximate to the peripheral portion of the optical film, the second portion is arranged at a side of the first portion distal to the optical film, the first portion includes an inner surface facing an interior of the backlight module and an outer surface opposite to the inner surface,
wherein a groove is formed in the first portion and extends from the inner surface to the outer surface, the lug structure at least includes a third portion and a fourth portion, the third portion is accommodated in the groove, a protrusion structure is formed on the outer surface, and the fourth portion extends along the outer surface and is sleeved on the protrusion structure.

In a possible embodiment of the present disclosure, an extension direction of the groove is a first direction, and the first direction intersects an extension direction of the fourth portion, and is parallel to a light-exiting surface of the optical film.

In a possible embodiment of the present disclosure, the first portion further includes a support surface for supporting a display panel, the support surface is arranged parallel to the light-exiting surface of the optical film, and arranged between the inner surface and the outer surface, and the groove is a concave structure formed in the support surface.

In a possible embodiment of the present disclosure, a groove depth of the groove in a second direction perpendicular to the light-exiting surface of the optical film is greater than a thickness of the optical film by 0.2 mm to 0.5 mm.

In a possible embodiment of the present disclosure, the groove includes a wall configured to be in contact with the lug structure to support the lug structure, the wall is arranged parallel to the light-entering surface of the optical film, a first height difference is provided between the wall and the light-entering surface of the optical film in a second direction, and the second direction is perpendicular to the light-exiting surface.

In a possible embodiment of the present disclosure, the first height difference is within a range of 0.1 mm to 0.2 mm.

In a possible embodiment of the present disclosure, a second height difference is provided between the support surface and the light-exiting surface of the optical film in a second direction, and the second direction is perpendicular to the light-exiting surface.

In a possible embodiment of the present disclosure, the second height difference is within a range of 0.2 mm to 0.5 mm.

In a possible embodiment of the present disclosure, the body portion includes a first region corresponding to a display region of the display panel, and an orthogonal projection of the inner surface of the first portion onto the light-entering surface of the optical film is located out of the first region.

In a possible embodiment of the present disclosure, a minimum distance between the orthogonal projection of the inner surface of the first portion onto the light-entering surface of the optical film and the first region in the first direction is within a range of 0.1 mm to 0.2 mm.

In a possible embodiment of the present disclosure, the backlight module further includes a front frame, wherein the front frame is arranged at periphery of the middle frame, and includes an inner side wall proximate to the middle frame and an outer side wall distal to the middle frame, a recess is formed in the inner side wall at a position corresponding to the lug structure, and the fourth portion is accommodated in the recess.

In a possible embodiment of the present disclosure, the recess penetrates through the inner side wall and the outer side wall of the front frame.

In a possible embodiment of the present disclosure, a bending point is formed at a joint between the third portion and the fourth portion, and the bending point is located beyond the outer surface of the middle frame and spaced apart from the outer surface of the middle frame by a first distance in the first direction.

In a possible embodiment of the present disclosure, the first distance is within a range of 0.1 mm to 0.2 mm.

In a possible embodiment of the present disclosure, the lug structure further includes a hole that is formed in the fourth portion and penetrates through the optical film, and the fourth portion is sleeved on the protrusion structure through the hole.

In another aspect, the present disclosure provides in some embodiments a display device, including:

the above-mentioned backlight module; and a display panel arranged at the light-exiting surface of the optical film.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "include" or "including" intends to indicate that an element or object before the word contains an element or object or equivalents thereof listed after the word, without excluding any other element or object. Such words as "connect/connected to" or "couple/coupled to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Before describing a display panel and a display device in the embodiments of the present disclosure in details, it is necessary to describe the related art as follows.

Figure 1:
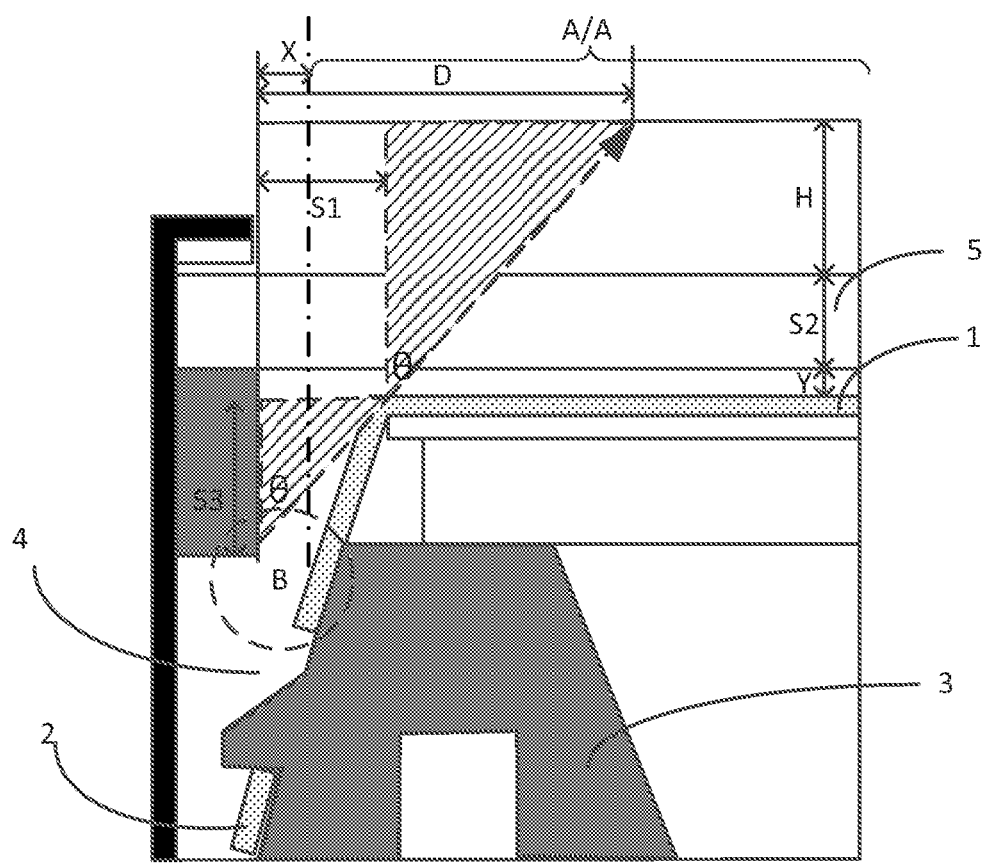
FIG. 1 is a schematic view of a display module in related art.

As shown in FIG. 1, as a scheme for fixing an optical film 1 of a display module in the related art, the optical film 1 is provided with a certain amount of lug structures 2, chutes 4 are formed in a side wall of a middle frame 3, and the lug structures 2 of the optical film 1 are inserted into the chutes 4 respectively so as to be hung on the side wall of the middle frame 3. A main problem in the related art lies in that the chute 4 formed in the middle frame 3 is opened upwardly and obliquely relative to the optical film 1, and there is a gap between the lug structure 2 of the optical film 1 and the chute 4 (as shown by a dotted box B in FIG. 1), so light exits the middle frame directly through the gap at this region and enters a screen 5. Due to an ultra-narrow bezel design, the lug structure 2 of the optical film 1 and the chute 4 in the side wall of the middle frame 3 are each arranged very proximate to a display region A/A of the screen 5, and a shadow of the lug structure is capable of being viewed in an image at a certain viewing angle. Hence, a visual effect and the user experience, and thereby display quality of the product, are adversely affected.

In the related art, a theoretical analysis on the design of the lug structure as well as a design parameter relationship will be described as follows.

In FIG. 1, X represents a minimum distance between an inner side wall of the middle frame 3 at a position corresponding to the chute and the display region A/A of the screen 5, Y represents a distance between a light-exiting surface of the optical film 1 and a lower polarizer of the screen 5, D represents a region where the shadow of the lug structure of the optical film 1 is visible, H represents a viewing distance in a direction Z of the screen for determining the shadow of the lug structure of the optical film, S1 represents a distance between the inner side wall of the middle frame 3 at the position corresponding to the chute and a bending point of the optical film, S2 represents a thickness of the screen 5, and S3 represents a distance between the bending point of the optical film and an upper edge of an opening of the chute in the middle frame.

When S1 is 0.6 mm, S2 is 1.74 mm and S3 is 2.84 mm, in a dotted triangle in FIG. 1, $\tan\theta = (D-0.6)/(H+1.74+Y) = 0.6/2.84$, so $D=0.21(H+Y)+0.95$ mm. Based on the above parameter relationship, D is in direct proportion to H and Y. When a value of D is to be decreased, it is necessary to reduce values of H and Y. However, even if Y is designed as 0 and the shadow of the lug structure is determined at a small viewing distance (e.g., H=100 mm), D=100.95 mm, i.e., the shadow of the lug structure is still visible at a distance of 100.95 mm from the screen. Hence, through the design scheme of the lug structure of the optical film in the related art, it is impossible to prevent the occurrence of the shadow of the lug structure.

An object of the present disclosure is to provide a backlight module and a display device, so as to prevent the occurrence of the shadow of the lug structure of the optical film and improve image quality of a display product.

As shown in FIGS. 2 to 6, the present disclosure provides in some embodiments a backlight module, which includes an optical film 100, a light guide plate 500 and a middle frame 200. The optical film 100 includes a light-exiting surface 100a and a light-entering surface 100b parallel to each other. The optical film 100 includes a body portion and a peripheral portion, and the body portion includes an optical film portion corresponding to a display region A/A of a display panel 400. In a possible embodiment of the present disclosure, an orthogonal projection of the body portion onto the light-entering surface 100b overlaps an orthogonal projection of the display region A/A onto the light-entering surface 100b. The peripheral portion is arranged in such a manner as to surround the body portion, and the peripheral portion includes a plurality of lug structures 110. The middle frame 200 surrounds the optical film 100 and is arranged proximate to the optical film 100. The middle frame 200 at least includes a first portion 210 surrounding the optical film 100 and a second portion 220 arranged at a side where the light-entering surface 100b of the optical film 100 is located. The light guide plate 500 is arranged at a side where the light-entering surface of the optical film 100 is located, and supported on the second portion 220. The first portion 210 is arranged outside the light guide plate 500, and the first portion 210 includes an inner surface 210a facing an interior of the backlight module and an outer surface 210b opposite to the inner surface 210a. The inner surface 210a faces the light guide plate 500, and the outer surface 210b is distal to the light guide plate 500. A plurality of transverse grooves 230 is formed in the first portion 210 at positions corresponding to the lug structures 110 and penetrates through the inner surface 210a and the outer surface 210b along a first direction F1, and the first direction F1 is parallel to the light-exiting surface 100a of the optical film 100. Protrusion structures 240 are formed on the outer surface 210b of the first portion 210. Each lug structure 110 passes through the corresponding transverse groove 230, and is bent and then sleeved on the protrusion structure 240.

Based on the above, the transverse grooves 230 are formed in the middle frame 200 of the backlight module in a direction parallel to the light-exiting surface 100a of the optical film 100, i.e., in a transverse direction. In addition, the protrusion structures 240 are formed on the outer surface of the middle frame 200. The lug structure 110 of the optical film 100 may directly extend out of the transverse groove 230, and it is then bent to cooperate with the corresponding protrusion structure 240 on the outer surface of the middle frame 200 for fixation. In the related art, the chute is formed in the side wall of the middle frame at a certain angle relative to the light-exiting surface of the optical film, i.e., the chute is opened upwardly and obliquely relative to the optical film, so a part of light exits the middle frame upwardly and obliquely at a position where an opening of the chute is located. In contrast, in the embodiments of the present disclosure, the transverse groove 230 in the middle frame 200 is formed in the transverse direction, and the lug structure 110 of the optical film 100 is directly inserted into the transverse groove 230. At this time, an opening of the transverse groove 230 is covered by the optical film 100, and less light exits the middle frame 200 at the opening of the transverse groove 230. Hence, no shadow of the lug structure 110 occurs at this region at a large viewing angle, so it is able to improve the image quality of the display product.

In the embodiments of the present disclosure, a theoretical analysis on the design of the lug structure 110 of the optical film 100 of the backlight module as well as a design parameter relationship will be described as follows.

Figure 2:
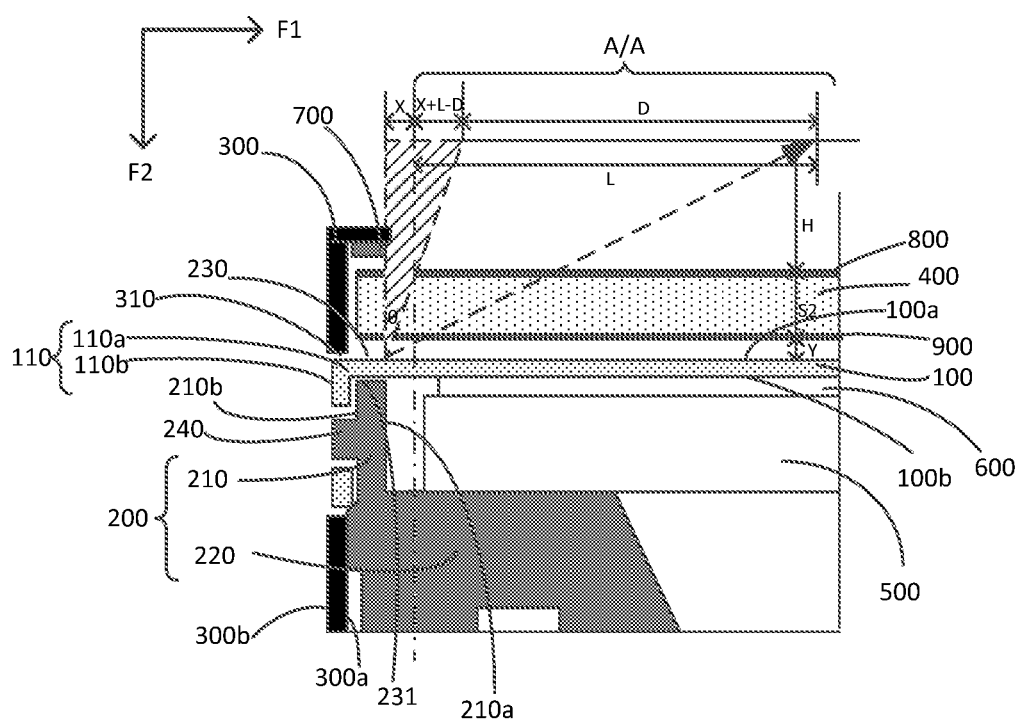
FIG. 2 is a sectional view of a backlight module according to an embodiment of the present disclosure.

In FIG. 2, L represents a distance in a width direction of a screen for determining the shadow of the lug structure 110 of the optical film 100, X represents a minimum distance between the inner surface 210a of the middle frame 200 at a position corresponding to the transverse groove 230 and the display region A/A of the display panel, Y represents a distance between the light-exiting surface 100a of the optical film 100 and a lower polarizer of the display panel 400, D represents a region where a shadow M of the lug structure 110 of the optical film 100 is visible, H represents a viewing distance in a direction Z of a screen for determining the shadow of the lug structure 110 of the optical film 100, and S2 represents a thickness of the display panel 400.

Taking S2=1.74 mm as an example, in a dotted triangle in FIG. 2, $\tan^\theta = Y/X = (X+L-D)/(H+1.74+Y)$, so $D=L-XH/Y-1.74X/Y$. Based on the above parameter relationship, D is in direct proportion to the distance L in a direction perpendicular to the screen for determining the shadow and the distance Y between the light-exiting surface 100a of the optical film 100 and the lower polarizer of the display panel 400, and in reverse proportion to the distance X between the inner surface 210a of the middle frame 200 at the position corresponding to the transverse groove 230 and the display region A/A of the display panel 400 as well as the viewing distance H in the direction Z of the screen for determining the shadow of the lug structure 110 of the optical film 100.

In the backlight module according to the embodiments of the present disclosure, when it is necessary to make the shadow of the lug structure 110 invisible, the region D where the shadow M of the lug structure 110 of the optical film 100 is visible needs to be smaller than or equal to 0. When D≤0, H≥YL/X−1.74, i.e., when H≥YL/X−1.74 has been meet in accordance with a reference for determining image quality and the design parameters, it is able to make the shadow of the lug structure 110 invisible. For example, when the reference for determining the image quality is L=680.4 mm (for a 55-inch screen width) and H=500 mm, 500≥680.4*Y/X−1.74, i.e., X≥1.36Y. Hence, for the backlight module in the embodiments of the present disclosure, the shadow of the lug structure 110 is invisible only when the above condition has been met. In actual use, in the case of different references for determining the image quality, the design parameters X and Y are adjusted appropriately.

Figure 3:
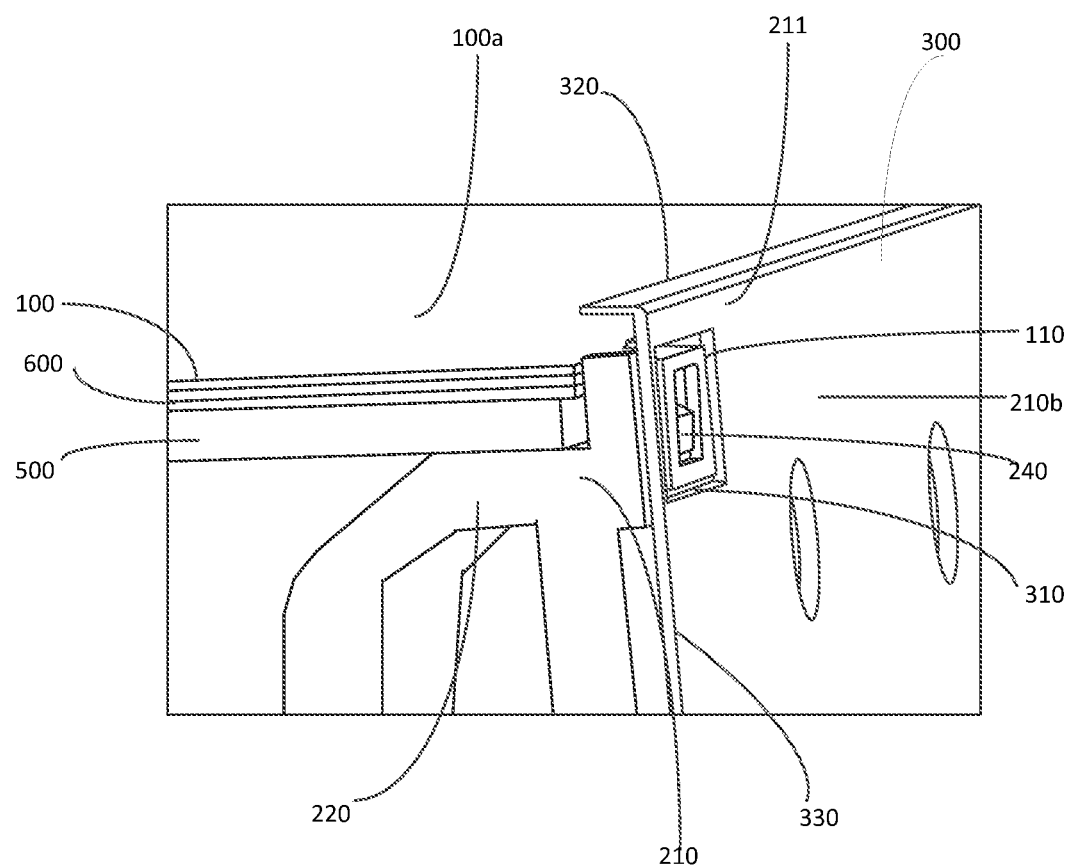
FIG. 3 is a solid view of the backlight module according to an embodiment of the present disclosure.
Figure 4:
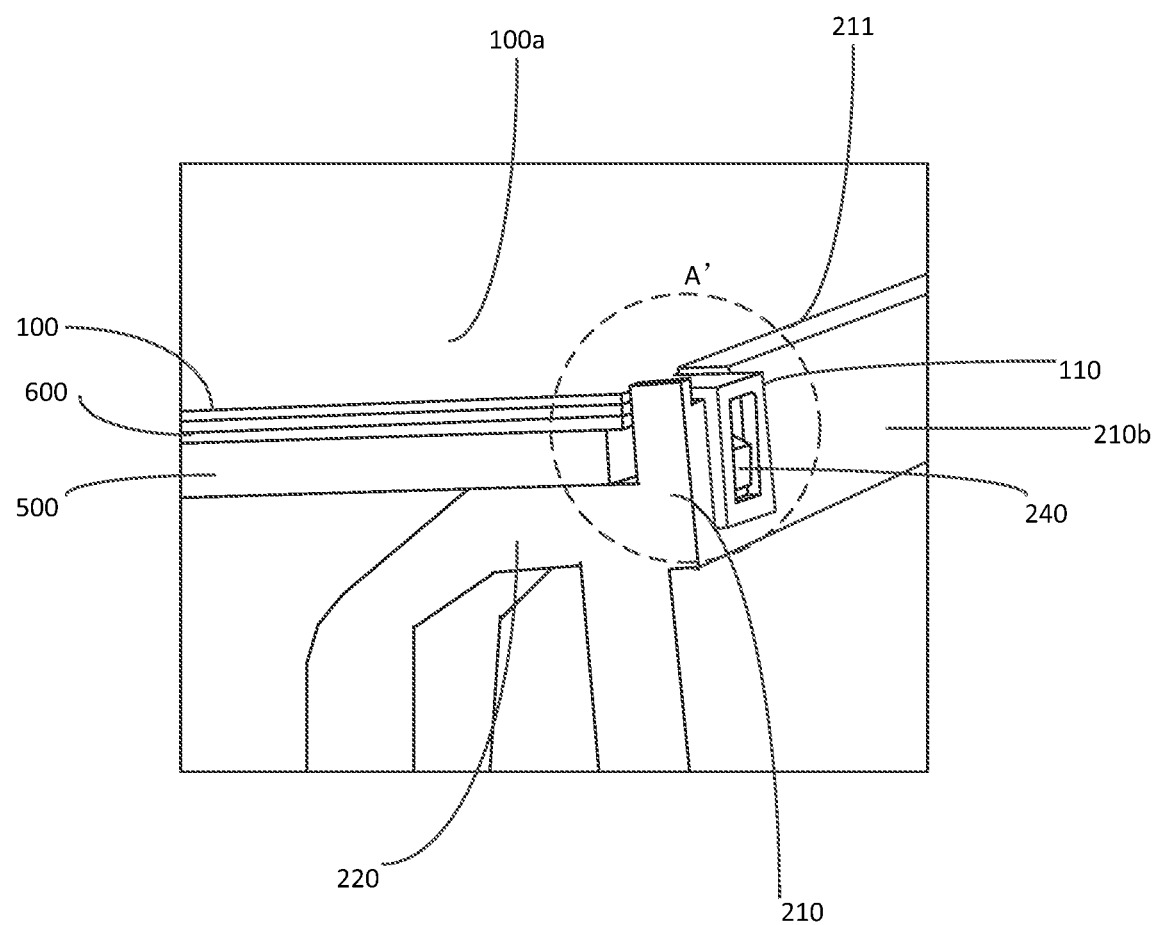
FIG. 4 is a solid view of the backlight module without a front frame according to an embodiment of the present disclosure.
Figure 5:
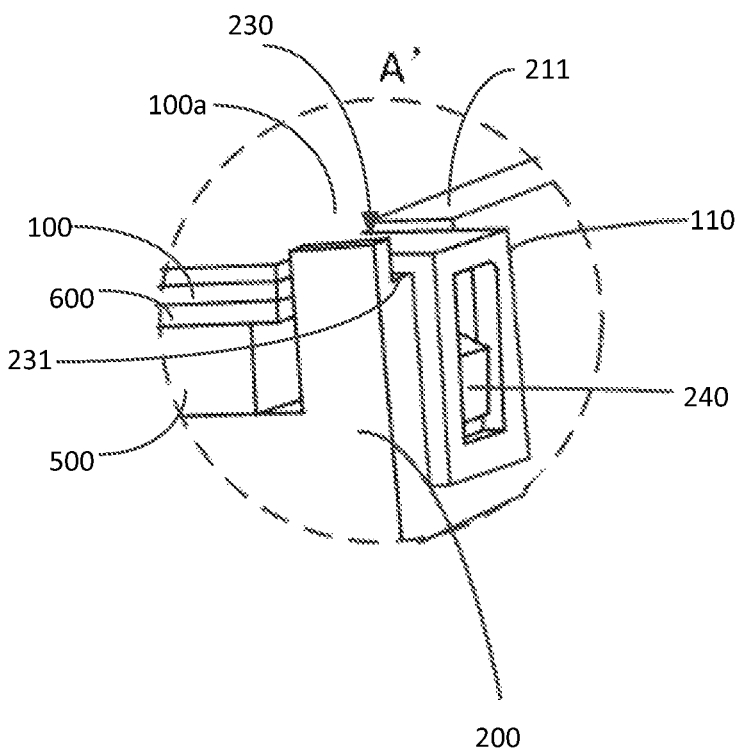
FIG. 5 is a topically enlarged view of a portion A' in FIG. 4.
Figure 6:
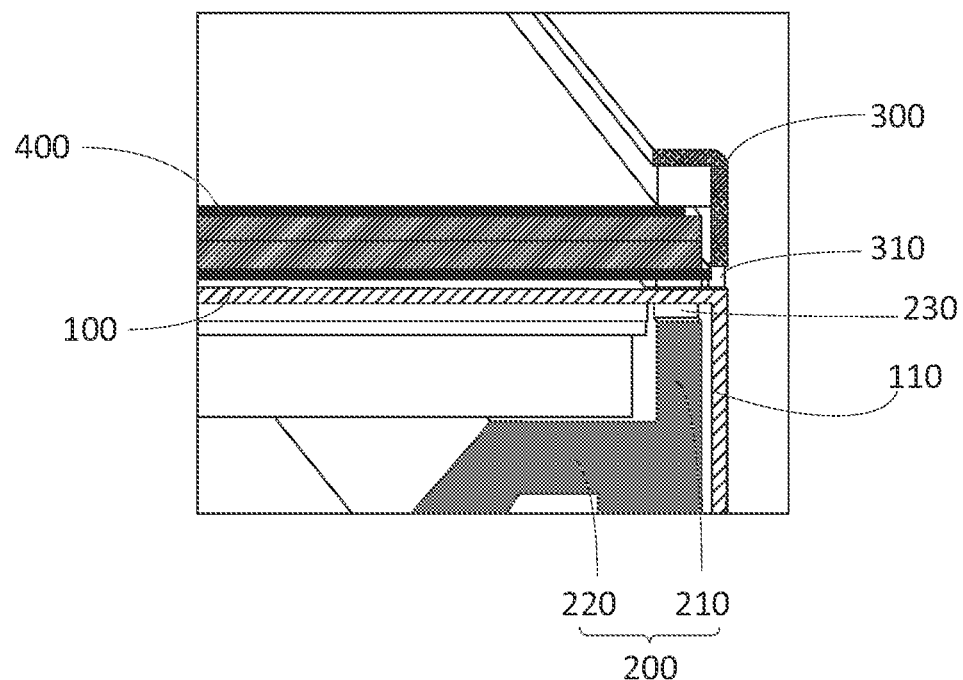
FIG. 6 is a solid view of a display device according to an embodiment of the present disclosure.

In a possible embodiment of the present disclosure, as shown in FIGS. 3 to 5, the first portion 210 further includes a support surface 211 for supporting the display panel 400. The support surface 211 is parallel to the light-exiting surface 100a of the optical film 100, and located between the inner surface 210a and the outer surface 210b. The transverse groove 230 is a concave structure formed in the support surface 211.

Based on the above, as shown in FIGS. 2 to 6, a concave part is formed in the support surface 211 of the middle frame 200 for supporting the display panel 400, so as to form the transverse groove 230. In this way, on one hand, the lug structure 110 of the optical film 100 is directly lapped onto the transverse groove 230 in the middle frame 200, and then the lug structure 110 is bent vertically to be hung on the protrusion structure 240 on the outer surface 210 of the middle frame 200, so as to fix the optical film 100 in a convenient manner. On the other hand, the region D where the shadow is visible is in direct proportion to the distance Y between the light-exiting surface 100a of the optical film 100 and the lower polarizer of the display panel 400, so the smaller the value of Y, the smaller the region D. At this time, when the concave part is formed in the support surface 211 to form the transverse groove, a second height difference between the support surface 211 and the light-exiting surface 100a of the optical film 100 in a second direction F2 is as small as possible, so as to meet the requirement on the parameter Y, thereby to enable the shadow of the lug structure 110 to be invisible.

It should be appreciated that, in actual use, the transverse groove 230 is a through-groove structure rather than a concave structure, i.e., the support surface 211 is a complete surface, which will not be particularly further defined herein.

In addition, for example, a groove depth of the transverse groove 230 in the second direction perpendicular to the light-exiting surface 100a of the optical film 100 is greater than a thickness of the optical film 100 by 0.2 mm to 0.5 mm. For example, the thickness of the optical film 100 is about 0.6 mm to 0.9 mm, and the groove depth of the transverse groove is within a range of 0.8 mm to 1.4 mm.

In addition, as shown in FIGS. 2 to 6, the transverse groove 230 includes a wall 231 for supporting the lug structure 110. The wall 231 is parallel to the light-entering surface 100b of the optical film 100, and a first height difference H1 is provided between the wall 231 and the light-entering surface 100b of the optical film 100 in the second direction F2 perpendicular to the light-exiting surface 100a.

Based on the above, there is the first height difference H1 between the lug structure 110 of the optical film 100 and the wall 231 of the transverse groove 230, and the wall 231 of the transverse groove 230 is located at a level lower than the light-entering surface 100b of the optical film 100. In this way, when the lug structure 110 of the optical film 100 is lapped onto the transverse groove 230, it is able to ensure that the light-exiting surface 100a of the optical film 100 is maintained at a same plane as a transverse portion of the lug structure 110.

For example, the first height difference H1 is within a range of 0.1 mm to 0.2 mm. Usually, the optical film 100 has a thickness of 0.6 mm to 0.9 mm, and when the first height difference H1 is within the range of 0.1 mm to 0.2 mm, it is able to ensure that the transverse portion of the lug structure 110 is flush with the optical film 100 with a certain gap, thereby to prevent the lug structure 110 from being damaged due to thermal expansion and contraction and improve a service life of the product. In a possible embodiment of the present disclosure, the first height difference H1 is 0.1 mm.

It should be appreciated that, in actual use, the value of the first height difference H1 is not limited to that mentioned hereinabove, and it is adjusted according to the practical need.

In addition, in a possible embodiment of the present disclosure, a second height difference H2 is provided between the light-exiting surface 100a of the optical film 100 and the support surface 211 in the second direction F2 perpendicular to the light-exiting surface 100a.

Based on the above, because the support surface 211 of the middle frame 200 is used for supporting the display panel 400, when the support surface 211 is located at a level higher than the light-exiting surface 100a of the optical film 100 by the second height difference H2, it is able for the support surface 211 of the middle frame 200 to support the display panel 400. In addition, the region D where the shadow is visible is in direct proportion to the distance Y between the light-exiting surface 100a of the optical film 100 and the lower polarizer of the display panel 400, so the smaller the value of Y, the smaller the region D. When the second height difference H2 between the support surface 211 and the light-exiting surface 100a of the optical film 100 has been determined, the value of Y between the lower polarizer of the display panel 400 and the light-exiting surface 100a of the optical film 100 is determined too, i.e., the second height difference H2 is just the value of Y.

For example, the second height difference H2 is within a range of 0.2 mm to 0.5 mm. Based on the above, the second height difference H2 between the support surface 211 and the light-exiting surface 100a of the optical film 100 in the second direction F2 is as small as possible, so as to meet the requirement on the parameter Y, thereby to enable the shadow of the lug structure 110 to be invisible.

It should be appreciated that, in actual use, the value of the second height difference H2 is not limited to that mentioned hereinabove.

In addition, in a possible embodiment of the present disclosure, as shown in FIG. 2, a region where the body portion of the optical film 100 is located is a first region corresponding to the display region A/A of the display panel 400. An orthogonal projection of the inner surface 210a of the first portion 210 onto the light-entering surface 100b of the optical film 100 is located out of the first region.

Based on the above, the region D where the shadow is visible is reverse proportion to the distance X between the inner surface 210a of the middle frame 200 at a position where the transverse groove 230 is formed and the display region A/A of the display panel 400, so when the transverse groove 230 is formed in the first portion 210 of the middle frame 200, the orthogonal projection of the inner surface 210a of the first portion 210 onto the light-entering surface 100b of the optical film 100 is located outside the first region. In other words, the larger the distance between the inner surface of the middle frame 200 at the position where the transverse groove is formed and the display region A/A of the display panel 400, the smaller the region D where the shadow is visible.

For example, when the backlight module in the embodiments of the present disclosure is used for a spliced screen, a bezel width needs to be very small. In order to meet the requirement on the bezel width, the minimum distance X between the orthogonal projection of the inner surface 210a of the first portion 210 onto the light-entering surface 100b of the optical film 100 and the first region in the first direction F1 is within a range of 0.1 mm to 0.2 mm. It should be appreciated that, in actual use, the numerical range of X is not limited thereto. For example, when the backlight module is not applied to the spliced screen or applied to different spliced products, different requirements need to be met, so the value of X needs to change accordingly, which will not be further particularly defined herein.

In addition, in a possible embodiment of the present disclosure, as shown in FIG. 2, the backlight module further includes a front frame 300 arranged at periphery of the middle frame 200, and including an inner side wall 300a facing the middle frame 200 and an outer side wall 300b distal to the middle frame 200. A recess 310 is formed in the inner side wall 300a at a position corresponding to the lug structure 110. After the lug structure 110 passes through the transverse groove 230 and is bent, a longitudinal portion 110b of the lug structure 110 is accommodated in the recess 310.

Based on the above, the recess 310 is formed in the front frame 300 at the position corresponding to the lug structure 110, so that the lug structure 110 is inserted into the recess 310 in the front frame 300 after being bent. In this way, it is able to further reduce the bezel width, and provide a distance between the inner surface 210a of the middle frame 200 at a position where the transverse groove 230 is formed and the display region A/A of the display panel 400 as large as possible, thereby to further prevent the occurrence of the shadow of the lug structure 110.

In a possible embodiment of the present disclosure, as shown in FIG. 2, the recess 310 is a notch penetrating through the inner side wall 300a and the outer side wall 300b of the front frame 300.

Based on the above, the notch is directly formed in the front frame 300 in such a manner as to penetrate through the front frame 300. Usually, the lug structure 110 has a thickness of about 0.2 mm and the front frame 300 has a thickness of about 0.3 mm. When the notch is formed in the front frame 300 and the longitudinal portion 110b of the lug structure 110 is accommodated in the recess 310 after the lug structure 110 has been bent, the lug structure 110 is approximately located at a same plane as the outer side wall of the front frame 300. In addition, it is able to provide a distance between the inner surface 210a of the middle frame 200 at the position where the transverse groove 230 is formed and the display region A/A of the display panel 400 as large as possible.

I should be appreciated that, in actual use, alternatively, the recess is formed in the inner side wall of the front frame 300 but does not penetrate through the front frame 300, which will not be particularly further defined herein.

In addition, it should be appreciated that, as shown in FIG. 2, in the backlight module in the embodiments of the present disclosure, the lug structure 110 includes the transverse portion 110a and the longitudinal portion 110b after being bent. The longitudinal portion 110b is fixed onto the outer surface 210b of the middle frame 200 through an adhesive tape. The longitudinal portion 110b includes a hole penetrating through the optical film 100, and the lug structure 110 is sleeved on the protrusion structure 240 through the hole.

In a possible embodiment of the present disclosure, a bending point of the lug structure 110 (i.e., a joint between the transverse portion 110a and the longitudinal portion 110b) is located out of the outer surface 210b of the middle frame 200, and separated from the outer surface 210b of the middle frame 200 in the first direction F1 by a first distance d1.

Based on the above, the bending point of the lug structure 110 is spaced apart from the outer surface 210b of the middle frame 200 by the first distance. In other words, the lug structure 110 shall extend to be beyond the outer surface 210b of the middle frame 200 and then the lug structure 110 is bent. On one hand, it is able to meet a requirement on a tolerance when the lug structure 110 is bent, thereby to bend the lug structure 110 vertically and fix it to the outer surface 210b of the middle frame 200. On the other hand, due to the first distance d2, it is able to prevent the lug structure 110 and the middle frame 200 from being damaged by the thermal expansion and contraction.

For example, the first distance d1 is within a range of 0.1 mm to 0.2 mm. To be specific, the first distance d1 is 0.1 mm. It should be appreciated that, the above range is for illustrative purposes only, and the first distance d1 is not limited thereto.

In addition, it should be appreciated that, another optical film layer, e.g., a lower diffusion plate 600, is also arranged between the optical film 100 and the light guide plate 500. In a possible embodiment of the present disclosure, as shown in FIG. 3, the front frame 300 includes a front frame portion 320 for shielding a periphery of a display surface of the display panel 400 and a side frame portion 330 surrounding the display panel 400, and a light-shielding adhesive 700 is attached onto the front frame portion 320, so as to provide a narrow bezel. Alternatively, the front frame 300 merely includes the side frame portion rather than the front frame portion, so as to achieve a bezel-free design.

In addition, it should be appreciated that, the backlight module in the embodiments of the present disclosure is applicable to various display modules, especially a narrow-bezel display module, e.g., a display module with a spliced screen.

As shown in FIG. 4, the present disclosure further provides in some embodiments a display device, which includes the above-mentioned backlight module, and a display panel 400 arranged at a side where the light-exiting surface 100a of the optical film 100 is located. For example, the display panel 400 includes a liquid crystal panel.

In addition, as shown in FIG. 2, for example, the display device further includes an upper polarizer 800 and a lower polarizer 900. The upper polarizer 800 is attached onto a display surface of the display panel 400, and the lower polarizer 900 is attached onto a back surface of the display panel 400.

Obviously, the display device in the embodiments of the present disclosure also has the beneficial effects of the backlight module, which will thus not be particularly defined herein.

Some description will be given as follows.

(1) The drawings merely relate to structures involved in the embodiments of the present disclosure, and the other structures may refer to those known in the art.

(2) For clarification, in the drawings for describing the embodiments of the present disclosure, a thickness of a layer or region is zoomed out or in, i.e., these drawings are not provided in accordance with an actual scale. It should be appreciated that, in the case that such an element as layer, film, region or substrate is arranged "on" or "under" another element, it may be directly arranged "on" or "under" the other element, or an intermediate element may be arranged therebetween.

(3) In the case of no conflict, the embodiments of the present disclosure and the features therein may be combined to acquire new embodiments.

The above embodiments are for illustrative purposes only, but the present disclosure is not limited thereto. A protection scope of the present disclosure is defined by attached claims.

What is claimed is:

1. A backlight module, comprising:
an optical film, wherein the optical film comprises a body portion and a peripheral portion, and the peripheral portion comprises a lug structure;
a middle frame, wherein the middle frame is arranged at a side where a light-entering surface of the optical film is located, and at least comprises a first portion and a second portion, the first portion is arranged proximate to the peripheral portion of the optical film, the second portion is arranged at a side of the first portion distal to the optical film, the first portion comprises an inner surface facing an interior of the backlight module and an outer surface opposite to the inner surface,
wherein a groove is formed in the first portion and extends from the inner surface to the outer surface, the lug structure at least comprises a third portion and a fourth portion, the third portion is accommodated in the groove, a protrusion structure is formed on the outer surface, and the fourth portion extends along the outer surface and is sleeved on the protrusion structure,
wherein an extension direction of the groove is a first direction, and the first direction intersects an extension direction of the fourth portion, and is parallel to a light-exiting surface of the optical film,
wherein the first portion further comprises a support surface for supporting a display panel, the support surface is arranged parallel to the light-exiting surface of the optical film, and arranged between the inner surface and the outer surface, and the groove is a concave structure formed in the support surface.

2. The backlight module according to claim 1, wherein a depth of the groove in a second direction perpendicular to the light-exiting surface of the optical film is greater than a thickness of the optical film by 0.2 mm to 0.5 mm.

3. The backlight module according to claim 2, wherein the groove comprises a wall configured to support the lug structure, the wall is arranged parallel to the light-entering surface of the optical film, a first height difference is provided between the wall and the light-entering surface of the optical film in a second direction, and the second direction is perpendicular to the light-exiting surface.

4. The backlight module according to claim 3, wherein the first height difference is within a range of 0.1 mm to 0.2 mm.

5. The backlight module according to claim 2, wherein a second height difference is provided between the support surface and the light-exiting surface of the optical film in a second direction, and the second direction is perpendicular to the light-exiting surface.

6. The backlight module according to claim 5, wherein the second height difference is within a range of 0.2 mm to 0.5 mm.

7. The backlight module according to claim 1, wherein the body portion comprises a first region corresponding to a display region of a display panel, and an orthogonal projection of the inner surface of the first portion onto the light-entering surface of the optical film is located out of the first region.

8. The backlight module according to claim 7, wherein a minimum distance between the orthogonal projection of the inner surface of the first portion onto the light-entering surface of the optical film and the first region in the first direction is within a range of 0.1 mm to 0.2 mm.

9. The backlight module according to claim 1, further comprising:
a front frame, wherein the front frame is arranged at periphery of the middle frame, and comprises an inner side wall facing the middle frame and an outer side wall distal to the middle frame, a recess is formed in the inner side wall at a position corresponding to the lug structure, and the fourth portion is accommodated in the recess.

10. The backlight module according to claim 9, wherein the recess penetrates through the inner side wall and the outer side wall of the front frame.

11. The backlight module according to claim 1, wherein a bending point is formed at a joint between the third portion and the fourth portion, and the bending point is located beyond the outer surface of the middle frame, and spaced apart from the outer surface of the middle frame by a first distance in the first direction.

12. The backlight module according to claim 11, wherein the first distance is within a range of 0.1 mm to 0.2 mm.

13. The backlight module according to claim 1, wherein the lug structure further comprises a hole that is formed in the fourth portion and penetrates through the optical film, and the fourth portion is sleeved on the protrusion structure through the hole.

14. A display device, comprising:
the backlight module according to claim 1; and
a display panel arranged at a side where the light-exiting surface of the optical film is located.

15. The display device according to claim 14, wherein a depth of the groove in a second direction perpendicular to the light-exiting surface of the optical film is greater than a thickness of the optical film by 0.2 mm to 0.5 mm.

16. The display device according to claim 15, wherein the groove comprises a wall configured to support the lug structure, the wall is arranged parallel to the light-entering surface of the optical film, a first height difference is provided between the wall and the light-entering surface of the optical film in a second direction, and the second direction is perpendicular to the light-exiting surface.

17. A backlight module, comprising:
an optical film, wherein the optical film comprises a body portion and a peripheral portion, and the peripheral portion comprises a lug structure;
a middle frame, wherein the middle frame is arranged at a side where a light-entering surface of the optical film is located, and at least comprises a first portion and a second portion, the first portion is arranged proximate to the peripheral portion of the optical film, the second portion is arranged at a side of the first portion distal to the optical film, the first portion comprises an inner surface facing an interior of the backlight module and an outer surface opposite to the inner surface;
a front frame, wherein the front frame is arranged at periphery of the middle frame, and comprises an inner side wall facing the middle frame and an outer side wall distal to the middle frame, a recess is formed in the inner side wall at a position corresponding to the lug structure, and the fourth portion is accommodated in the recess;
wherein a groove is formed in the first portion and extends from the inner surface to the outer surface, the lug structure at least comprises a third portion and a fourth portion, the third portion is accommodated in the groove, a protrusion structure is formed on the outer surface, and the fourth portion extends along the outer surface and is sleeved on the protrusion structure,
wherein an extension direction of the groove is a first direction, and the first direction intersects an extension direction of the fourth portion, and is parallel to a light-exiting surface of the optical film,
wherein the recess penetrates through the inner side wall and the outer side wall of the front frame.

* * * * *